Oct. 9, 1945.                        P. GLASS                         2,386,677
                        PULSATING CIRCUIT AND CONTROL SYSTEM
                        Filed Dec. 2, 1942            4 Sheets-Sheet 1

INVENTOR.
PAUL GLASS
BY
A. D. Adams
ATTORNEY

Oct. 9, 1945. P. GLASS 2,386,677
PULSATING CIRCUIT AND CONTROL SYSTEM
Filed Dec. 2, 1942 4 Sheets-Sheet 3

INVENTOR.
PAUL GLASS
BY
A. D. Adams
ATTORNEY

Oct. 9, 1945.  P. GLASS  2,386,677
PULSATING CIRCUIT AND CONTROL SYSTEM
Filed Dec. 2, 1942  4 Sheets-Sheet 4

INVENTOR.
PAUL GLASS
BY
A. D. Adams
ATTORNEY

Patented Oct. 9, 1945

2,386,677

UNITED STATES PATENT OFFICE 2,386,677

PULSATING CIRCUIT AND CONTROL SYSTEM

Paul Glass, Chicago, Ill., assignor to Askania Regulator Company, Chicago, Ill., a corporation of Illinois Application December 2, 1942, Serial No. 467,669

13 Claims. (Cl. 315—199)

This invention relates to a pulsation circuit employing a gas discharge tube or relay for supplying periodic groups of current pulses to a load device or consumption circuit. The pulsation circuit involves means for varying the number of pulses in each pulse group and thereby varying the effective value of the load current. It also involves means for varying the group frequency of the load current, that is, the rate of groups per unit of time. The pulsation circuit provides a convenient means for establishing a current of variable effective value from elementary current pulses of substantially constant and uniform value. The pulsation circuit is especially useful for supplying direct current of variable value from an alternating current circuit.

My invention also relates to control systems employing the pulsation circuit wherein the number of pulses in each group is controlled in response to variations in an input voltage supplied to the pulsation circuit.

One object of the control system is to energize the load with an average current proportional to the amplitude of the applied signal or control voltage.

Another object is to eliminate the "dead zone" of the gas discharge tube and to render the tube responsive to signal or control voltages of low magnitude. This is accomplished by supplying to the grid of the tube an A. C. suppressing voltage of fixed amplitude greatly in excess of that required to prevent conduction of the tube when the suppressing voltage is 180° out of phase with the anode voltage, and then shifting the phase of the suppressing voltage so that it leads the anode voltage by slightly less than 180° and is just on the critical point of allowing conduction of the tube. Conduction of the tube is then controlled by supplying the signal or control voltage to the grid circuit with a phase displacement of substantially 90° with respect to the suppressing voltage, thereby causing a shift in phase of the resultant grid voltage in a direction to cause firing of the tube.

Examples of my pulsation circuit and control system are shown in the accompanying drawings, in which.

Figures 1, 1A, 1B, 2, 3:
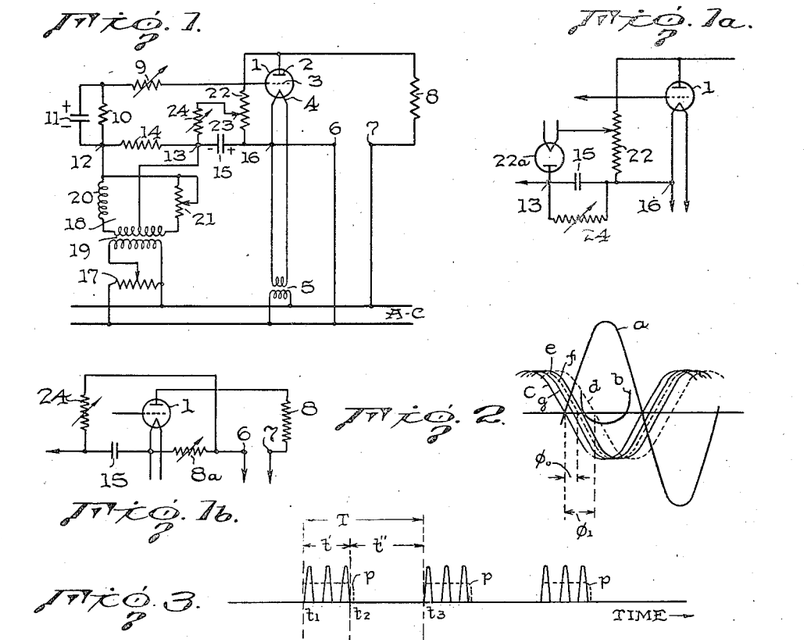
Fig. 1 is a circuit diagram of one form of pulsation circuit.
Figs. 1a and 1b are a modification of the circuit shown in Fig. 1.
Fig. 2 is a diagram of voltage waves useful for explaining the operation of the various circuits.
Fig. 3 is a diagram showing three groups of current pulses flowing in the load circuit.

Referring to Fig. 1, I is an electron tube of the gas discharge type having a plate 2, a control grid 3 and a cathode 4. Cathode 4 is shown to be of the filament type, and is energized from the secondary of a transformer 5 whose primary is connected to the A. C. supply line.

In the plate circuit of tube I points 6, 7, being connected to the supply line, represent a source of alternating potential, and 8 is a load of any desired kind which is to be energized by the device.

Tracing the grid circuit of tube I, grid 3 is connected through a variable resistor 9 to a parallel network comprising resistor 10 and condenser 11. Further in the grid circuit are resistor 14 and condenser 15 which connects to the cathode of tube I at point 16.

The points 12, 13 represent the terminals of a source of potential which is derived from the supply line through potentiometer 17 and a phase shifting network 18. This network is shown to consist of a transformer 19 with a center-tapped secondary, an inductance coil 20, and a variable resistor 21, but any other phase shifting circuit may be used instead. A voltage divider or potentiometer 22 is connected between plate 2 and cathode 4 of tube I, and its slider 23 connects through a variable resistor 24 to point 13, whereby resistance 24 is connected in shunt to condenser 15 through a variable portion of potentiometer 22.

The time constant of the resistance-condenser network 10, 11 is so arranged that it is short compared with the time constant of the network comprising condenser 15, variable resistor 24, and part of potentiometer 22. The latter resistance is usually small compared with resistance 24. The capacitance of condenser 15 is large compared with the capacitance of condenser 11.

Referring now to Fig. 2, curve $a$ represents the supply voltage as measured at points 6, 7 of the plate circuit. Curve $b$ is the critical grid voltage characteristic of the gas discharge tube. Curve $c$ shows the A. C. grid voltage, as measured at points 12, 13 when the phase shifter 18 is adjusted for zero phase shift, that is, the grid voltage $c$ is opposite in phase to plate voltage $a$. If the phase shifter 18 is adjusted for a phase shift angle $\phi$I the A. C. grid voltage between points 12 and 13 is represented by curve $d$.

Before describing the operation of the circuit in detail, it may be stated that the device supplies groups of current pulses to the load, as shown in Fig. 3, each group being formed of half-wave current pulses of equal amplitude and having a frequency equal to the frequency of the supply voltage 6—7. During the time interval $t1$ to $t2$, which is called the "on-time" ($t'$), current pulses are being delivered to the load, while during the interval $t2$ to $t3$, called "off-time" ($t''$) no current flows. The sum of the on-time plus off-time is equal to the group period T, and the reciprocal of T (group period) is the group frequency. Depending on the character of the load, each group of elementary current pulses may be integrated into a single current pulse flowing during the on-time $t'$ as shown by the dotted pulses $p$ in Fig. 3. The average current supplied to the load will be determined by the ratio of the on-time $t'$ to the group period T, and this ratio may be varied between zero and 1. The value of the 1 in this ratio indicates a continuous series of half-wave current pulses or an uninterrupted rectified alternating current.

Figure 4:
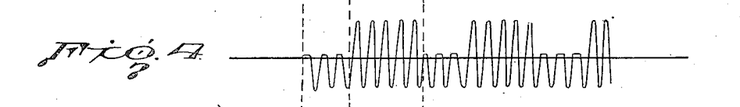
Figs. 4 and 5 are curves related to Fig. 3, Fig. 4 showing the variations in plate voltage for the tube in Fig. 1, and Fig. 5 showing the variation in grid potential of the tube in Fig. 1.
Figure 5:
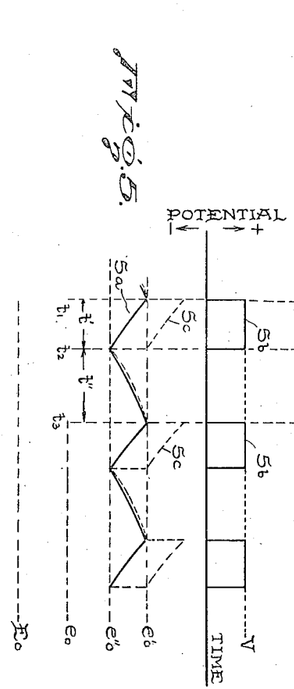

Suppose now that for a given adjustment of the phase shifter 18 the voltage at point 12, 13 is represented by curve $d$ in Fig. 2. Then tube 1 will break down at the beginning of every positive half-cycle of the supply voltage and deliver current to the load while no current flows during the negative half-cycles. It will be noted that curve $d$ intersects the critical curve $b$ near the beginning of each positive half cycle of curve $a$, and current flows through the load for substantially the entire time of each positive half cycle. During the on-time two different events take place in the grid circuit of the tube. The first concerns the condenser 15 which is connected through resistor 24 in parallel to the plate-cathode potential of the tube, assuming for a moment that the maximum potential is taken off voltage divider 22. As shown in Fig. 4, the plate-cathode potential during the on-time consists of negative half wave pulses which charge the condenser 15 with a polarity indicated in Fig. 1. If the on-time is long enough condenser 15 would finally assume the voltage $E_0$, corresponding to the negative D. C. component of the plate-cathode voltage pulses, or a certain smaller value $e_0$ (Fig. 5) according to the adjustment of the potentiometer slider 23. Figs. 3, 4 and 5 all have the same scale along the time axis, but Fig. 5 has an enlarged scale of voltage values with respect to the scale of Figs. 3 and 4. In Fig. 5 the dotted horizontal line $E_0$ represents the negative D. C. component of the plate-cathode voltage pulses, while the horizontal line $e_0$ represents a smaller potential according to the adjustment of potentiometer slider 23. The downwardly sloping portions of curve 5$a$ in Fig. 5 show variations in the voltage across condenser 15 while the condenser is being charged, and the upwardly sloping portions show changes in the condenser voltage during times of discharge. As will be seen from Fig. 5, condenser 15 never becomes completely discharged and it never reaches the final potential $e_0$, but when it reaches a negative potential of a value $e_0''$, the potential on the grid is sufficiently negative to prevent current from flowing in the tube. During the following off-time the condenser then discharges through resistor 24 and potentiometer 22 until it has reached a still smaller negative potential $e_0'$ at the instant $t_3$. At this time the potential on the grid has been reduced to a sufficiently low negative value to permit current to flow in the tube and a new on-time starts, and the cycle is repeated. As a result, the potential of condenser 15 oscillates between the values $e_0'$ and $e_0''$ as is shown by solid-line curve 5$a$ in Fig. 5.

The second event taking place in the grid circuit during an on-time refers to condenser 11. As is well known an ion grid current flows in the grid circuit of a gas discharge tube if the grid is at a negative potential during conduction. Thus, condenser 11 is charged with a polarity indicated in Fig. 1 during each on-time. Since the time constant of the network 10, 11 is small compared with the time constant of the circuit 15, 24 the final potential V across condenser 11 builds up rapidly at the start of every on-time, and breaks down as rapidly at the end of the on-time. This is schematically shown by curve 5$b$ of Fig. 5 which represents the potential V across condenser 11. The sum of the two condenser voltages is given by the dotted-line curve 5$c$ in Fig. 5. The function of condenser 11 is to maintain the grid potential below the value $e_0'$ during the on-time and until its positive potential has been exceeded by the increase of negative charge on condenser 15.

The total grid potential at the beginning of every positive half-cycle of the supply voltage determines whether or not the tube will conduct current during the following half-cycle. This total grid potential can be obtained with good approximation by adding the combined condenser potentials of condensers 11 and 15 to the instantaneous value of the A. C. voltage across points 12, 13. This latter value depends, of course, on the position of potentiometer 17, and on the amount of phase shift applied by the phase shifter 18. If the total grid potential at the beginning of a positive half-cycle exceeds the critical grid voltage in a positive direction the tube will conduct current. This occurs, for instance, at the instant $t_1$ in Fig. 5. At this instant, due to the positive charge acquired by condenser 11, the total grid potential is made still more positive, thus assuring conduction during every positive half-cycle of the on-time. At the instant $t_2$ the total grid potential has just become more negative than the critical grid potential and conduction stops. Since the influence of condenser 11 suddenly disappears the total grid potential is made still more negative, according to curve 5$c$, thus preventing any conduction during the following off-time.

Figure 6:
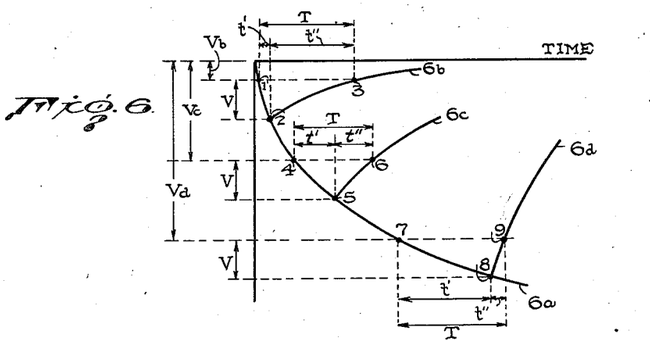
Figs. 6 to 9, inclusive, are diagrams useful in explaining the operation of Fig. 1.

It will now be described how it is possible to adjust, within wide limits, the period of operation or the group frequency and also the ratio of on-time to period of operation, or the average load current. Referring to Fig. 6, the influence of the phase shift angle $\phi$ shall be considered first.

The curve $6a$ in Fig. 6 shows the increasing potential acquired by condenser 15 during charging. Curves $6b$, $6c$ and $6d$ represent the decreasing potential on condenser 15 where the charging is stopped at points 2, 5 and 8, respectively. From the description given previously, it will be understood that condenser 15 is charged during the on-time and its voltage continues to rise until the net voltage impressed on the grid of the tube reaches a value corresponding to the critical cut-off value of the tube. The voltage across condenser 5 will therefore increase to a negative value sufficient to overcome the positive voltage V of condenser 11 and also supply any negative component required to fix the potential of the grid 3 at the critical value. In Fig. 6, the negative voltage required on condenser 15 to keep the tube from firing for a certain low phase displacement $\phi$ is represented by the voltage $Vb$, and the voltage V represents the voltage component of condenser 15 necessary to overcome the positive voltage of condenser 11. Accordingly, when the condenser voltage reaches the point 2 the tube will be cut off and condenser 15 will begin discharging along the curve $6b$.

If the phase angle $\phi$ is increased so that the voltage 12—13 leads voltage 6—7 by a smaller amount, then voltage 12—13 will have a greater positive value (or a smaller negative value) at the instant when the tube would normally start, and this situation would require the condenser 15 to build up a larger negative potential in order to prevent the starting of the tube. For example, with an increased angle $\phi$, the condenser 15 would continue to charge until the potential reached a value corresponding to point 5 on curve $6a$, then would cut off the tube. This potential would be sufficient to overcome the positive voltage V on condenser 11 and also establish a negative component $Vc$ which is required to neutralize the instantaneous value of the voltage 12—13 at the beginning of the positive pulse of the plate-cathode voltage. For a still greater angle of $\phi$, the instantaneous positive component of the voltage 12—13 at the start of each cycle would be correspondingly greater, and condenser 15 must build up to a correspondingly higher negative value before the tube will be cut off. For example, for a still greater value of $\phi$, the condenser 15 would continue to charge until its voltage reached the point 8 on curve $6a$ which is sufficient to neutralize the positive voltage V of condenser 11 and supply the negative component $Vd$ necessary to overcome the positive instantaneous value of the voltage 12—13 at the beginning of the plate-cathode voltage pulse.

From Fig. 6 it will be seen that for low values of $\phi$, the on-time $t'$ is small by comparison with the off-time $t''$, and the resultant load current would be small. As the angle $\phi$ is increased, or as the voltage 12—13 is set at a smaller leading angle with respect to the voltage 6—7, the on-time $t'$ increases and the off-time $t''$ decreases so that for the condition shown at the points 4—5—6 in Fig. 6, the two periods are substantially equal. Under this condition the effective load current would be about one-half maximum value. If the phase angle $\phi$ is still further increased, the on-time increases and the off-time decreases until under the conditions shown at the points 7—8—9 in Fig. 6, the on-time covers a very large percentage of the group time T. Thus, the effective value of the load current may be changed from no current to full value by varying the phase angle $\phi$. This is accomplished by varying resistance 21 in phase shifter 18. Any other form of phase shifting device may be employed for this purpose.

As shown in Fig. 6, variation of the phase angle $\phi$ also varies the period of operation T, and the minimum value of T occurs for the condition where the ratio $t'/T = 0.5$.

Figure 7:
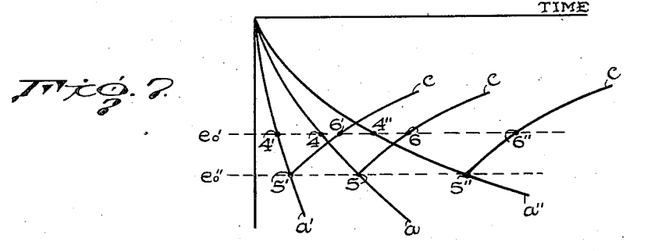

It is further possible to adjust the on-time $t'$ alone leaving the value of $t''$ unchanged by shifting tap 23 on potentiometer 22. This is shown with reference to Fig. 7 in which the phase angle $\phi$ is assumed to be adjusted to a certain value which determines $e_0'$ and $e_0''$. By varying the charging voltage of condenser 15, taken off the potentiometer 22, different charging characteristics of condenser 15 can be obtained as shown by curves $7a$, $7a'$, $7a''$. Curve $7a'$ refers to a high, curve $7a''$ to a low charging voltage. Since the discharging characteristic $c$ and the values $e_0'$ and $e_0''$ remain unchanged with a change of the charging voltage, it is obvious from Fig. 7 that the off-times $t_6'—t_5'$, $t_6—t_5$, $t_6''—t_5''$ are the same in all cases. However, the on-times have been changed, $t_5'—t_4'$ being smaller and $t_5''—t_4''$ being larger than $t_5—t_4$. Therefore, the on-time alone can be changed by adjustment of the potentiometer slider 23. The on-time decreases, and therefore the value of the load current decreases, with increase in charging voltage applied to condenser 15.

Figure 8:
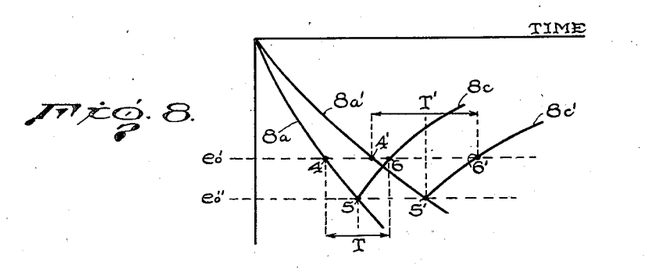

Another possible adjustment is the simultaneous change of both on-time and off-time which can be accomplished by adjusting the variable resistor 24. In Fig. 8, curves $8a$ and $8c$ show the charging and discharging characteristics of condenser 15 for a given value of resistor 24 while curves $8a'$ and $8c'$ show the same characteristics for a higher resistance value. Thus, in the example of Fig. 8, the ratio of $t'/T$ remains constant while the period of operation T is prolonged. The reverse is true for a reduction of resistor 24. Thus it is possible to keep the average load current constant while varying the group frequency.

The frequency range of the pulse generator can be greatly extended if two further adjustment methods are combined with the ones already described. The first refers to a change of the variable resistor 9 which influences the grid current. It is obvious that a reduction of grid current can be obtained by increasing the value of resistance 9, and vice versa. Accordingly the potential V across condenser 11 can be changed which determines the working range $e_0''—e_0'$.

Figure 9:
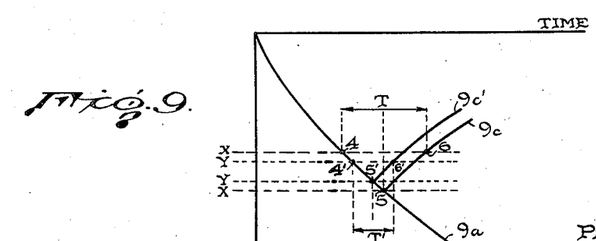

In Fig. 9 curves $9a$ and $9c$ are again the charging and discharging characteristics of condenser 15 for a given value of resistor 9, with lines $x$, $x$ indicating the limit potentials $e_0'$ and $e_0''$ of condenser 15. If now resistor 9, for instance, is increased the limit lines $xx$ will be transferred to the new positions $yy$. While the charging characteristic $9a$ remains the same, the new discharging characteristic is shown to be curve $9c'$, and the new working range is indicated by points $4'$, $5'$, $6'$. As can be seen from the example of Fig. 9, the period of operation has been decreased from T to T' while maintaining the ratio $t'/T$ unchanged. The reverse effect is obtained by decreasing the value of resistor 9.

The second method refers to a change of the effective value of the grid A. C. voltage as measured at points 12, 13 of Fig. 1 which is accomplished by adjusting the potentiometer 17. The principal effect of this voltage change is again to influence the relative position of the limit lines $xx$ in Fig. 9 moving them closer together for a smaller voltage, as indicated by lines $yy$ in Fig. 9, and moving them further apart for higher voltages. Increasing the A. C. grid voltage also tends to shift lines $xx$ further from the time axis or vice versa. A change of the adjustment of potentiometer 17 thus further extends the frequency range obtainable from the device.

Although the influence of the various adjustments has been described with reference to a phase shift angle $\phi$ for which the ratio $t'/T$ is approximately equal to 0.5 the same methods can be applied for any value of $\phi$, and the results can be easily derived accordingly. It can be seen, therefore, that the pulse generator of Fig. 1 is capable of delivering groups of pulses of rectified A. C. current where the group frequency and the ratio $t'/T$, i. e., the average energy supplied to the load, is variable within wide limits.

The amplitude of A. C. grid voltage 12—13 will depend upon several factors, including the value of condenser 15, the time constant of the circuit of condenser 15 and the charging voltage applied to condenser 15, but in general the maximum value of 12—13 should greatly exceed the value required to prevent firing of the tube where the voltage is opposite in phase with respect to the anode voltage. In the normal operation of Fig. 1, voltage 12—13 would be adjusted in phase so that it leads the anode voltage by an angle somewhat less than 180° and the voltage applied to the grid at the beginning of each positive anode pulse is such as to allow firing of the tube in the absence of a charge on condenser 15, or where the charge on condenser 15 is below a certain value.

From Fig. 6 it will be seen that for a wide range of control of the effective value of load current by shifting the phase of voltage 12—13, the charging circuit for condenser 15 should permit charging of the condenser to a voltage several times as much as the voltage V to which condenser 11 is charged by the positive ion current. Also, the maximum instantaneous value of voltage 12—13 should be of the same order of magnitude as the maximum voltage to which condenser 15 may be charged.

In one actual embodiment of Fig. 1, operating on a 60 cycle supply, it was possible to obtain a period of operation T varying from 0.2 to 12 seconds, corresponding to a range of groups frequency from 5 to 0.0833 groups per second, or 300 to 5 groups per minute.

In Fig. 1a, I have shown a modified arrangement of the circuit of Fig. 1 wherein the resistance 24 is connected directly in shunt to condenser 15 and the condenser is charged through a two-element rectifier 22a connected between the potentiometer slider 23 and terminal 13. This arrangement isolates the condenser 15 from the plate circuit except during the negative pulses of the cathode-plate voltage.

Figures 11, 12, 13:
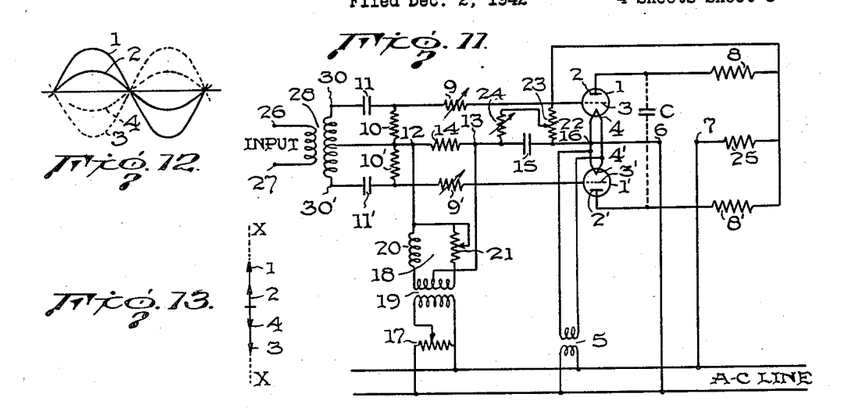
Fig. 11 is a circuit diagram showing a control system employing the pulsation circuit shown in Fig. 1 and embodying two vacuum tubes.
Figs. 12 to 17 inclusive are diagrams illustrating phase relations between certain voltages in the circuit of Fig. 10.

In Fig. 1b condenser 15 is charged during the on-time by the voltage drop across impedance 8a in the cathode lead. Element 8a may be a variable resistance or it may be the load device. In Fig. 11 it may be the auxiliary load 25.

Figure 10:
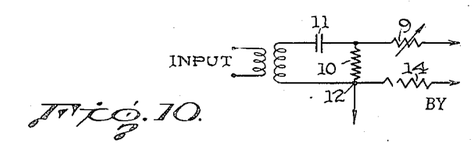
Fig. 10 shows a modification of the circuit of Fig. 1 for controlling the pulsation circuit by electric signals.

The circuit of Fig. 1 can be made responsive to an external signal voltage or control voltage by introducing the voltage into the input circuit by means of a transformer connected into the circuit of resistance 18 and condenser 11 as shown in Fig. 10, the remainder of the circuit being as indicated in Fig. 1. If the control voltage has certain phase relations with respect to the supply voltage and to the voltage at terminals 12—13, as will be described later, then the average current supplied to the load will be proportional to the amplitude of the signal voltage, and it is still possible to adjust the group frequency as explained above. Since the modification shown in Fig. 10 is an intermediate step between Fig. 1 and Fig. 11, the operation of Fig. 10 will be understood from the following description of Fig. 11.

The circuit as shown in Fig. 11 is similar to the circuit of Fig. 1, and the same reference numerals are used for elements already contained in the earlier figure. However, the circuit is supplemented by a second gas discharge tube 1' with plate 2', grid 3' and cathode 4', and the additional grid elements 9', 10', 11'. The load devices 8 and 8', contained in the plate circuits of tubes 1 and 1' respectively, are connected through the auxiliary load 25 to point 7 of the voltage source. The signal or control voltage is applied to the input terminals 26, 27 which are connected to the primary of a transformer 28. The secondary of transformer 28 is center-tapped with tap 29 connected to point 12 while the extremities 30 and 30' of the secondary connect to condensers 11 and 11' respectively. As can be seen from Fig. 11, the grid circuits of tubes 1 and 1' are made up of a common branch extending from cathode point 16 via points 13 and 12 to point 29 while the individual branches extend from point 29 via point 30 to grid 3, and via point 30' to grid 3', respectively.

The signal or control voltage applied to input terminals 26, 27 may be derived from any suitable potential source as will be described later. The signal voltage is of the same frequency as the supply line frequency, and is variable in amplitude as well as sign. This is made clear by referring to Fig. 12 where curves 1 and 2 represent two signals of the same sign and of different amplitudes while curves 3 and 4 show signals of the reverse sign having the same amplitudes as curves 1 and 2 respectively. Fig. 13 shows the same relations in vectorial form with the line $xx$ indicating the direction of the signal voltage vector. It is an important feature of this circuit that the direction of this vector (control voltage vector) should be displaced by approximately 90 degrees with respect to the vector of the supply voltage, as will now be described.

Figure 14:
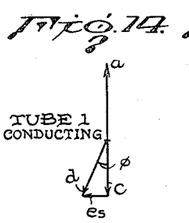

In Fig. 14, vector $a$ represents the line voltage, and vector $c$ the potential across points 12, 13 for zero adjustment of phase shifter 18. Considering now the grid circuit of tube 1, Fig. 11, the signal voltage with vector $e_s$ is impressed as an additional potential at points 29, 30. According to the above statement the direction of vector $e_s$ is displaced by approximately 90 degrees with respect to the vector of the line voltage $a$, as shown in Fig. 14. Vector $d$ as the sum of the vectors $c$ and $e_s$ represents the total A. C. grid potential of tube 1. As a consequence, by applying a comparatively small signal voltage to the input of the circuit, vector $c$ can be shifted in phase by an angle $\phi$ while its amplitude does not change substantially. Thus the same effect is accomplished as was obtained in Fig. 1 by applying a phase shift $\phi$ at the phase shifter 18, and consequently tube 1 will conduct current.

Figure 15:
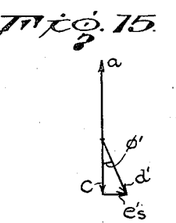

Turning now to the grid circuit of tube 1', vectors $a$ and $c$ are the same as before but the signal voltage impressed between points 29 and 30' is now given by vector $e_s'$ as shown in Fig. 15.

Figure 16:
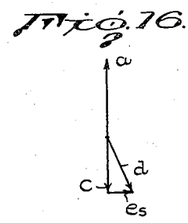
Figure 17:
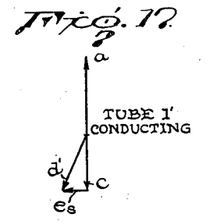

Thus a phase shift of the same magnitude but in the opposite direction takes place, preventing tube 1' from breaking down at the beginning of the positive half-cycles of the line voltage. As a result, if the signal voltage is of a sign as indicated by vectors $e_s$ and $e_s'$ in Figs. 14 and 15, tube 1 will conduct current and energize load 8 while tube 1' does not supply any energy to its load 8'. If now the sign of the signal voltage is reversed the signs of vectors $e_s$ and $e_s'$ are reversed as is shown in Figs. 16 and 17. Evidently now tube 1' will deliver current while tube 1 remains non-conducting. It has thus been shown that according to the sign of the signal one or the other tube delivers current to the load associated with it.

The action of the on-and-off control of load current need not be explained here since it operates exactly in the manner as was described for the pulse generator. However, one difference should be mentioned regarding the necessity of an auxiliary load resistor 25, shown in Fig. 11. Assume for a moment resistor 25 to be zero; then the potentiometer 22 would be directly connected to the A. C. line, and the voltage across it would contain no D. C. component to charge condenser 15. Take now the normal case with resistor 25 connected as shown in Fig. 11, and assume tube 1 conducting during an on-time. Then during a positive half-cycle the voltage across potentiometer 22 will be equal to the line voltage minus the voltage drop across resistor 25 while, during a negative half-cycle, the voltage is equal to the line voltage. Now the potentiometer voltage contains a D. C. component which charges condenser 15 in the described manner. If it is desired to supply a maximum energy to the load devices 8 and 8' resistor 25 should be kept as low as possible.

One object of the circuit of Fig. 11 is to energize a load with an average current proportional to the amplitude of the applied signal. From Figs. 14 to 17 it is evident that the phase shift angle $\phi$ increases with increasing signal voltage $e_s$. Remembering the effect of increasing values of $\phi$ as outlined in connection with Fig. 1, it is apparent that the ratio $t'/T$, or the average load current, increases with increasing signal amplitude. Measurements show that a direct proportionality between average load current and signal amplitude can be obtained without difficulty.

It should be noted that, so far, the phase shifter 18 had been assumed to be adjusted for zero phase shift. Its function will now be described. In Fig. 2 curve $a$ again shows the line voltage, curve $b$ the critical grid characteristic, and curve $c$ the potential across points 12, 13 with phase shifter 18 adjusted for zero phase shift. Suppose a signal, applied to the input terminals, causes curve $c$ to be shifted to the right. According to the well known laws of gas discharge tubes conduction cannot occur until curve $c$ has reached a position $e$ just touching characteristic $b$. In other words, the signal has to exceed a certain value before the device starts to energize one or the other load: A "dead zone" is present. It is the object of phase shifter 18 to reduce this dead zone considerably by pre-shifting the phase of curve $c$ by a definite angle $\phi_0$. The width of the "dead zone," and therefore the amount of phase shift necessary to overcome the dead zone is dependent on the amplitude of voltage 12—13 and increases with the amplitude of this voltage. As shown in Fig. 2 phase shifter 18 in Fig. 11 is assumed to be adjusted for a phase angle $\phi_0$ shifting the voltage curve to position $f$. Then conduction is still safely prevented as long as no signal is applied to the input. Since, according to Fig. 11, the phase shifter 18 is contained in the common branch of the grid circuits, the pre-phase shift refers to both grids alike.

If now a small signal appears across the input, curve $f$ will be further shifted, according to the sign of the signal, to position $e$ for one tube causing that tube to conduct current, and to position $g$ for the other tube preventing it from conducting. The introduction of the phase shifter 18 therefore eliminates the dead zone which frequently causes trouble in devices of the described nature. Resistor 21, in the example of Fig. 11, provides a simple means of adjusting the preliminary phase shift angle $\phi_0$ to a value where conduction of one or the other tube is initiated by a very small signal.

Referring now to the sources of signal voltage, the signal should be of line frequency, and its vector direction at the input terminals should be displaced by approximately 90 degrees with respect to the vector of the line voltage. In cases where the signal source itself does not deliver a signal of the right phase, an additional phase shifting device can be inserted between signal source and input terminals. Also an amplifier may be connected between the signal source and the input of the device, as will be seen in the following examples.

Figure 18:
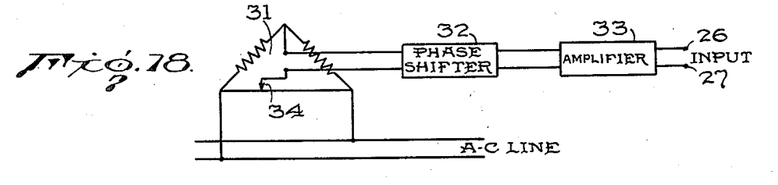
Figs. 18, 19 and 20 are circuit diagrams illustrating various arrangements for supplying control voltages to the circuit of Fig. 10.

As a first example, a Wheatstone bridge as signal source is shown in Fig. 18. Since the bridge is connected to the A. C. line its output or signal vector will have the same direction as the line voltage vector. Therefore a phase shifter 32 is introduced which is so adjusted as to displace the vector of the bridge output voltage by approximately 90 degrees. In this example an amplifier 33 is shown to be inserted between phase shifter 32 and the input terminals 26, 27 of the device. If the bridge 31 is balanced no signal will be applied to the input, and neither tube will conduct current. If now the bridge is unbalanced by moving the slider 34 in one or the other direction, a signal of one or the other sign will be applied to the input terminals, and one or the other tube will deliver current to its load. At the same time, the average amount of load current will be proportional to the deviation of the slider from the balance position.

Figure 19:
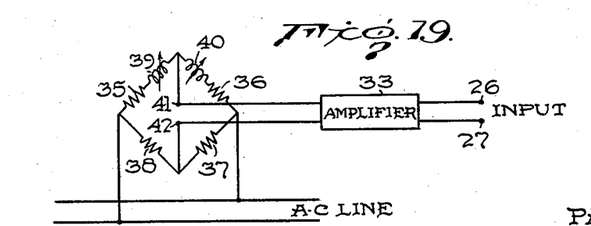

In Fig. 19, as a second example, a bridge circuit is shown consisting of four fixed resistors 35, 36, 37, 38, and two variable inductances 39 and 40. One variable and one fixed inductance may be used instead. The impedance of coils 39, 40 is assumed to be small compared with the resistance values of resistors 35 and 36. Assuming that the resistance balance condition is fulfilled an output voltage will appear at points 41, 42 when the inductance balance is disturbed. In the circuit of Fig. 19 the bridge output vector will then be displaced by 90 degrees against the supply voltage vector, as follows from the theory of A. C. bridge circuits. In this case no additional phase shifter is required, and the signal voltage is applied to input terminals 26, 27 through amplifier 33, as shown in Fig. 19.

Figure 20:
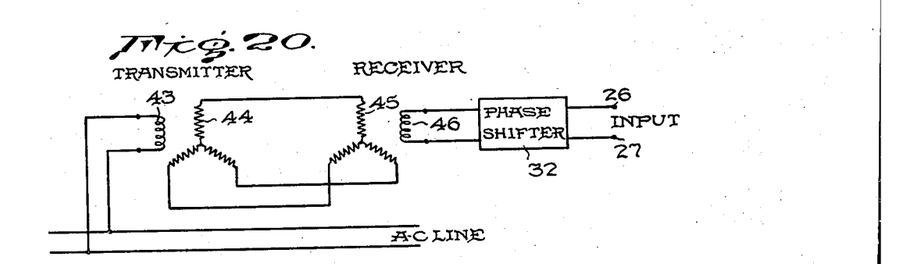

As a third example, in Fig. 20 a pair of self-synchronous motors is shown as the source of signal potential. Rotor 43 of the transmitter is connected to the A. C. line, and the stators 44 and 45 are connected in the usual manner. Rotor 46 of the receiver is connected through phase shifter 32 to the input terminals 26, 27. If desired an amplifier may again be connected between signal source and input terminals. For a certain relative position of rotors 43 and 46 no E. M. F. will be induced in rotor 46 resulting in no signal voltage. If, however, rotor 43 is moved out of its balance position in one or the other direction of rotation a voltage will be induced in rotor 46 which is of one or the other sign according to the direction of original displacement. The direction of the voltage vector of receiver rotor 46 coincides with the direction of the line voltage vector. Therefore, a phase shift of approximately 90 degrees is introduced by phase shifter 32 to obtain the desired phase relation of the signal voltage. One or the other load will be energized according to the direction of displacement of rotor 43, and the average load current will be proportional to the magnitude of the displacement. It should be mentioned that the wound rotor type of self-synchronous motors is preferred although the salient pole type gives also very satisfactory results.

Regarding the load devices 8 and 8', any device may be used as for instance heaters, relays or solenoids. Another example is a motor of the series commutator type as load device. In this case, referring to Fig. 11, load 25 represents the motor armature, and 8 and 8' are two field coils in series with the armature such that energization of one or the other field coil causes the motor to rotate in one or the other direction of rotation. While the operation of the motor from the pulse control circuit will be understood without further discussion one important point has yet to be mentioned. It has been observed that after correct adjustment of the phase shifter 18 and upon application of small signals both tubes became conductive at the same time resulting in a reduction of motor speed and torque. Thus, below a certain small signal voltage the device did not operate satisfactorily. It was possible to eliminate this dead zone by connecting a condenser C across the plates 2 and 2' of the tubes, as shown in Fig. 11. As an explanation it is believed that a component of high frequency and high voltage is superimposed upon the line voltage resulting from the action of the motor commutator. The voltage peaks applied to the plate of the non-conducting tube cause that tube to break down as well. Condenser C, if connected as shown, acts as a short circuit for the high frequency component, and prevents the disturbance from reaching the plate of the non-conducting tube.

Figure 21:
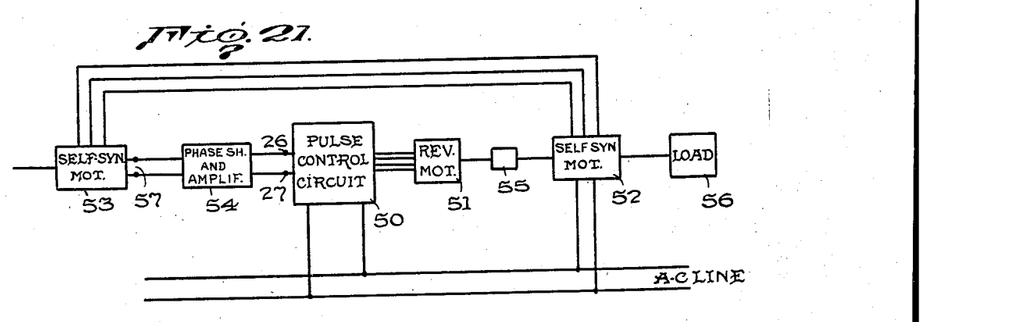
Fig. 21 is a diagram of a remote control system illustrating one application of the circuit of Fig. 10.

A useful combination of signal source and load device with the pulsation circuit is obtained if a pair of self-synchronous motors is used together with a reversible motor, as described above. In the block diagram of Fig. 21 50 is the pulse control circuit of Fig. 11 with the input terminals 26, 27. The circuit supplies energy to the double field series motor 51 as was explained earlier. Coupled to its shaft through a gear train 55 is the shaft of a self-synchronous motor 52 whose rotor is electrically connected to the A. C. line. A load 56 may be connected to the shaft of motor 52. Another self-synchronous motor is shown at 53 whose stator is connected in the usual manner to the stator of motor 52, and whose rotor terminals 57 connect through a combined phase shifter and amplifier 54 to the input terminals 26, 27 of the pulse control circuit.

Assuming that the rotors of motors 52 and 53 are in the neutral position, no signal voltage is applied to input terminals 26, 27, and consequently the pulse control circuit does not supply any energy to motor 51. If now the rotor of motor 53 is displaced in one direction of rotation, a signal is supplied to the input 26, 27 and circuit 50 causes the motor 51 to rotate in one direction of rotation. At the same time, the rotor of self-synchronous motor 52 is rotated also, and its direction of rotation is assumed to be such as to reduce the relative displacement of rotors 52 and 53. Consequently the signal at terminals 26, 27 will be reduced, and so is the motor speed, until motor 52 has reached a new balance position, resulting in signal voltage zero and standstill of motor 51. As a result, rotor 52 assumes the same angular position as rotor 53. It is to be noted that the self-synchronous motors are required to furnish only a signal voltage as an indication of their relative rotor positions, but do not transmit any mechanical torque. The necessary energy for rotation of rotor 52 and load 56 into the synchronous position is supplied from the pulse control circuit, and is limited only by the size of the tubes and motor used. Therefore, at the receiving end, i. e., load 56, a high torque with a high accuracy is available while at the transmitting end, i. e., shaft 53, a very low torque is required for positioning of the transmitting rotor. The pulse control circuit in combination with the reversible motor acts as torque amplifier for a set of self-synchronous motors.

Figure 22:
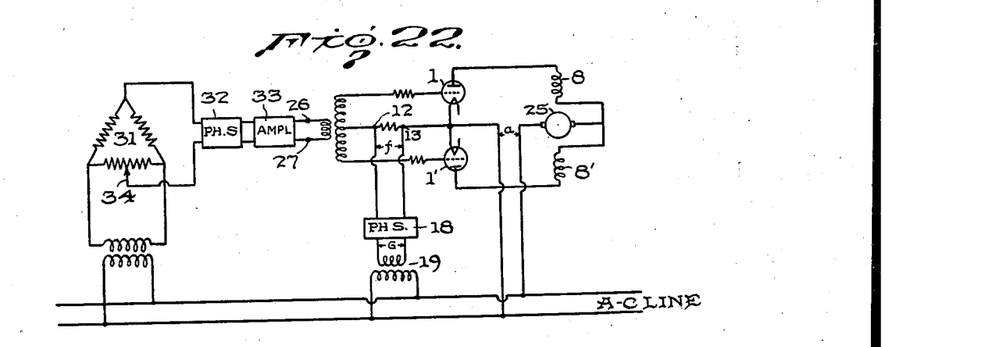
Fig. 22 is a diagram illustrating a modification of the circuit of Fig. 10.

In Fig. 22, I have shown a modification of the circuit of Fig. 11 omitting the pulsating feature. In this arrangement, elements corresponding to similar elements in Fig. 11 are indicated by like reference numerals. As will be seen, Fig. 22 omits the condenser 15 and its charging circuit, and it also omits condensers 11 and resistances 10. The circuit does include transformer 19 and phase shifter 18 for supplying the suppressing voltage to the grid circuits across terminals 12—13. As in Fig. 11, the voltage 12—13 has a value greatly in excess of that necessary to prevent operation of the tubes when the suppressing voltage is opposite in phase to the anode voltage, and it is shifted in phase by phase shifter 18 to overcome the "dead zone" referred to above and to fix the circuit at the critical operating point. The signal or control voltage supplied to the input terminals 26, 27 may be derived from any suitable source such as from a Wheatstone bridge 31 having a slider 34, the signal voltage being supplied through a phase shifter 32 and an amplifier 33. As explained before, the signal voltage at terminals 26 and 27 has a phase angle of substantially 90 degrees with respect to the anode voltage of the tubes.

A signal voltage of one sign in Fig. 22 will cause one tube to fire and therefore rotate armature 25 in one direction, while the signal voltage of the opposite sign will cause the other tube to fire and rotate armature 25 in the opposite direction. In this case, the control of the motor circuit will be a simple on-and-off control, and the motor operating current will not vary in accordance with the amplitude of the signal voltage. One advantage of the arrangement of Fig. 22 is that very small signal voltages are required to operate the motor in one direction or the other. In an actual embodiment, the motor responds to the movement of a magnetic armature of less than ±0.001 inch. Another advantage of the control circuit of Fig. 22 is that the action of the circuit is not materially affected by unavoidable extraneous variations in the amplitude of the control voltage 12—13. This improved result is obtained by reason of the fact that in both Figs. 11 and 22, the signal voltage is utilized to control the firing of the tubes by shifting of the phase of the resultant grid voltage instead of by varying the amplitude of the resultant grid voltage as in prior devices.

The time constant of the charging and discharging circuit of condenser 15 should be adjustable to be relatively long by comparison with the cycle period of the A. C. current supply, that is it should require several cycles to charge or discharge condenser 15.

The circuit of Fig. 1 is useful for any purpose where it is desired to supply a load circuit or device with a current formed of a series of integrated current pulses of variable pulse frequency and variable ratio of on-time to off-time. It will be useful in many applications requiring the periodic suppression of current pulses in certain cycles of an alternating current supply.

Fig. 10 shows how the circuit of Fig. 1 may be used as a control circuit responsive to a variable input signal or control wave. It will be obvious that the circuit of Fig. 1 may also be used as a control circuit by merely arranging for one or more of the variable elements of the circuit to be mechanically varied in accordance with variations in a condition to be controlled, indicated or repeated.

What is claimed is:

1. In combination, a gaseous discharge tube, a grid circuit for said tube including two series connected condensers, an anode circuit for said tube including a source of alternating current, a discharge path connected in shunt to each of said condensers, means for charging one of said condensers from said anode circuit in a direction to apply a negative potential to said grid, means for supplying an alternating current voltage wave to said grid circuit of the same frequency as said source, said alternating grid voltage wave serving to charge the other condenser in the opposite direction by the positive ion current flowing in said grid circuit during conduction of said tube and having an effective value greatly in excess of the value required to prevent firing of said tube when said wave is opposite in phase to the anode voltage wave, and means for variably shifting the phase of said grid voltage wave to thereby vary the effective value of the current in said anode circuit.

2. A combination according to claim 1 wherein the discharge path of the condenser which is charged from the anode circuit has a time constant relatively long with respect to the time constant of the discharge path of the other series connected condenser.

3. A combination according to claim 1 and including means for varying the charging voltage applied to said one condenser from said anode circuit.

4. A combination according to claim 1 wherein the condenser receiving a charge from the anode circuit is charged to a relatively high value and the other condenser is charged to a relatively small value by the positive ion current flowing in said grid circuit during conduction of said tube.

5. A combination according to claim 1 wherein said phase shifting means is set to fix the phase of said grid voltage wave to lead the anode voltage wave by an angle slightly less than 180° and normally prevents the firing of said tube, and including means for decreasing the leading phase angle of said grid voltage wave in accordance with variations of a variable condition.

6. A combination according to claim 1 wherein said phase shifting means is set to fix the phase of said grid voltage wave to lead the anode voltage wave by an angle slightly less than 180° and normally prevents the firing of said tube, and including means for introducing into said grid circuit a control voltage wave of variable amplitude and having a leading phase angle with respect to said anode voltage wave of substantially 90°.

7. In combination, a pair of gaseous discharge tubes, grid circuits for said tubes each including two series-connected condensers, anode circuits for said tubes including a source of alternating current for supplying anode voltage waves of the same phase relation, a discharge path connected in shunt to each of said condensers, means for charging one of said condensers from said anode circuits in a direction to apply a negative potential to the grid of each tube, means for supplying from said alternating current source to said grid circuits a grid voltage wave having an effective value greatly in excess of the value required to preventing first of said tubes when said grid waves are opposite in phase to said anode voltage waves, phase shifting means for setting the phase of said grid voltage waves to a leading angle slightly less than 180° with respect to said anode voltage waves, whereby the "dead zone" in the control of said tubes is overcome while still suppressing the firing thereof, and means for introducing into said grid circuits control voltage waves of variable amplitude but of opposite phase relation and being displaced in phase by substantially 90° with respect to said anode voltage waves.

8. In combination, a gaseous discharge tube, a grid circuit for said tube, an anode circuit for said tube including a source of alternating current, means for supplying from said source to said grid circuit an alternating voltage wave having an effective value greatly in excess of the value required to prevent firing of said tube when said wave is opposite in phase to the anode voltage wave, phase shifting means for fixing the phase of said grid voltage wave at a leading angle slightly less than 180° with respect to the anode voltage wave to overcome the "dead zone" in the control of said tube, and means for supplying to said grid circuit a control voltage wave of variable amplitude and having a leading phase angle of substantially 90° with respect to said anode voltage wave.

9. A combination according to claim 8 wherein said control voltage wave varies in amplitude and also reverses in phase, and including a second gaseous discharge tube having a grid circuit supplied with a grid voltage wave from said phase shifting device and a plate circuit supplied from said source, and including means for introducing in the grid circuit of said second tube a control voltage wave from the same source as the control voltage wave introduced in the grid circuit of said first tube but of opposite phase relation, whereby variations in amplitude of said control voltage waves increase the phase angle of the resultant wave in one grid circuit and decrease the phase angle of the resultant wave in the other grid circuit.

10. In combination, a gaseous discharge tube having a cathode, an anode and a grid, a grid circuit for said tube including a series connected condenser, an anode circuit for said tube insluding a source of alternating current, an impedance element connected in series with the cathode lead in said anode circuit, a connection for charging said condenser by the voltage drop across said impedance element, said connection having a relatively long time constant, a second condenser connected in series with said grid circuit, means for supplying alternating current to said grid circuit to charge said second condenser in the opposite direction by positive ion current, and a discharge path of relatively short time constant connected in shunt to said second condenser.

11. A combination according to claim 1 wherein said means for charging one of said condensers from said anode circuit comprises an impedance element connected in the cathode lead of said anode circuit, and a connection for charging said one condenser by the voltage drop across said impedance element.

12. In combination, a gaseous discharge tube, a grid circuit for said tube, an anode circuit for said tube including a source of alternating current, means for supplying from said source to said grid circuit a biasing alternating current voltage wave substantially opposite in phase to the anode voltage wave and having an effective value sufficient normally to prevent firing of said tube, and means for supplying to said grid circuit a control voltage wave of variable effective amplitude and having a leading phase angle of substantially 90° with respect to said anode voltage wave.

13. In combination, a pair of gaseous discharge tubes, a grid circuit for each of said tubes, anode circuits for said tubes including a source of alternating current for supplying anode voltages of the same phase relation, means for supplying from said source to said grid circuits alternating voltage waves substantially opposite in phase with respect to the anode voltage waves and having effective values sufficient normally to prevent firing of said tubes, and means for supplying to said grid circuits control voltage waves of opposite phase relation and substantially in phase quadrature with respect to said anode voltage waves.

PAUL GLASS.